United States Patent Office 3,770,655
Patented Nov. 6, 1973

3,770,655
AMMONIA OR AMINE MODIFIED ORGANO-
MAGNESIUM CATALYST COMPOSITIONS
Edwin J. Vandenberg, Foulk Woods, Wilmington, Del.,
assignor to Hercules Incorporated, Wilmington, Del.
No Drawing. Continuation-in-part of application Ser. No.
5,149, Jan. 22, 1970, which is a continuation-in-part
of application Ser. No. 694,374, Dec. 29, 1967, both
now abandoned, which in turn is a continuation-in-part
of application Ser. No. 18,888, Mar. 31, 1960, now
Patent No. 3,415,761. This application Oct. 19, 1971,
Ser. No. 190,689
Int. Cl. C07f 3/02; C08g 23/14
U.S. Cl. 252—431 N                                5 Claims

ABSTRACT OF THE DISCLOSURE

Certain modified organomagnesium compounds have been discovered, which are particularly useful as polymerization catalysts. These new catalyst compositions comprise the reaction product of an organomagnesium compound such as a dialkylmagnesium with ammonia or an amine which has at least two sites for reaction with the organomagnesium compound admixed with an inert organic diluent and/or a complexing agent for the modified organomagnesium compound.

---

This is a continuation-in-part of my copending application Ser. No. 5,149, filed Jan. 22, 1970, and now abandoned, which is in turn a continuation-in-part of my application Ser. No. 694,374 filed Dec. 29, 1967, and now abandoned, which is in turn a continuation-in-part of my application Ser. No. 18,888, filed Mar. 31, 1960, now U.S. Pat. No. 3,415,761.

This invention relates to catalyst compositions comprising modified organomagnesium compounds. More particularly, this invention relates to halogen-free organomagnesium compounds modified by reaction in a liquid diluent with ammonia, primary amines or hydroxy-substituted primary or secondary amines.

Halogen-free organomagnesium compounds are known in the art as catalysts in the polymerization of epoxides as shown in U.S. Pat. No. 2,870,100. However, the use of unmodified organomagnesium as catalysts results in low yields of relatively low molecular weight polymers.

In my earlier filed application Ser. No. 18,888 there are described halogen-free organomagnesium compounds that have been modified by reaction in a liquid diluent with at least one polyreactive compound. When these modified compounds are used in the polymerization of epoxides, they greatly increase the rate of polymerization and yield. In addition, their use results in much higher molecular weight polymers which in some cases are more stereoregular. The amount of the total polyreactive compound that is reacted with the organomagnesium compound is critical and should be an equivalent mole ratio within the range of from about 0.01 to about 0.7, and preferably from about 0.05 to about 0.5, of the polyreactive compound to the organomagnesium compound. By the term "equivalent mole ratio" as used in this specification and claims is meant the moles of polyreactive compound containing two reactive sites per equivalent of magnesium compound.

Any organomagnesium compound, which contains at least one magnesium-carbon bond and no halogen, when reacted with the above-mentioned polyreactive compounds can be used in the preparation of the catalyst compositions of this invention. Preferably the organomagnesium compound will have the formula RR'Mg where R is any hydrocarbon radical, as for example, alkyl, alkenyl, cycloalkyl, cycloalkenyl, aryl, alkaryl, cycloalkyl aryl, etc., and R' is the same as R or is H or —OR. Exemplary of the organomagnesium compounds that can be used in the preparation of the catalyst compositions of this invention are dimethylmagnesium, diethylmagnesium, dipropylmagnesium, diisopropylmagnesium, di-n-butylmagnesium, diisobutylmagnesium, di-(tert-butyl)-magnesium, diamylmagnesium, dioctylmagnesium, dicyclohexylmagnesium, diphenylmagnesium, ethylmagnesium hydride, butylmagnesium hydride, methoxy methylmagnesium, ethoxy ethylmagnesium, magnesacyclonona-3,7-diene, etc. Various methods of preparing these compounds are known in the art. For example, one well known method of preparing diorganomagnesium compounds is to add dioxane to an ether solution of a Grignard reagent. The dioxane precipitates magnesium dihalide leaving the diorganomagnesium compound in solution. Another method is by the reaction of magnesium with a diene to form a cyclic organomagnesium compound. This latter reaction can be shown as follows:

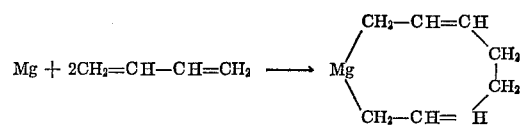

As pointed out above, the organomagnesium compound is reacted with a polyreactive compound selected from the group consisting of ammonia, primary amines and hydroxy-substituted primary or secondary amines to form the modified organomagnesium compound. By the term "polyreactive compound" is meant a compound which has at least two sites for reaction with the organomagnesium compound. Thus, the polyreactive compounds of this invention contains at least two active hydrogens, i.e., hydrogen attached to nitrogen or oxygen, as is present in —NH₂, —NHR and —OH groups, an ammonia.

As stated above, the compounds that can be used as the polyreactive compound for the reaction with the organomagnesium compound to form the modified compounds of this invention are ammonia, primary amines and hydroxy-substituted primary or secondary amines. Suitable amines which contain at least two active hydrogens are the alkylamines and particularly methylamine, ethylamine, n-butylamine, amylamines, etc., arylamines such as aniline, aralkylamines, such as benzylamine, cycloalkylamines, such as cyclohexylamine; primary alkylenediamines, such as ethylenediamine, diethylenetriamine, triethylenetetramine, hexamethylenediamine, p-phenylenediamine; cyclic diamines such as piperazine; hydroxylamine; aminoalcohols such as ethanolamine, tetrahydroxyethyl ethylenediamine, etc.; hydrazine, phenyl hydrazine, etc.

The exact structure of the modified organomagnesium compound of this invention is not known. It is believed that a reaction takes place whereby a portion of the hydrocarbon group attached to the magnesium is replaced with another group, the latter depending upon the polyreactive compound used. It is believed that the modified organomagnesium compound consists of at least two organomagnesium groups joined together by the polyreactive compound. Thus, if the polyreactive compound is difunctional, the modified organomagnesium compound would have the formula

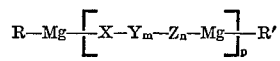

where R is a hydrocarbon group, R' is a hydrocarbon group, H or —OR, X and Z are oxygen, nitrogen or

and at least one of X and Z is nitrogen or

Y is a divalent moiety derived from the polyreactive compound, $m$ is 0 or 1, $n$ is 0 to 1, and $p$ is 1 or more. If the polyreactive compound contains three or more reactive sites, then one obtains highly branched structures, as for example,

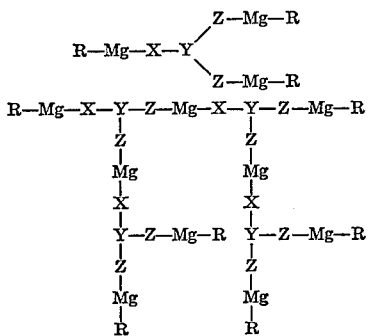

Regardless of what the theory of the reaction may be, it is essential that the product of this invention retain magnesium to carbon bonds in an amount of from about 0.2 to about 1.8 carbon bonds per magnesium atom, and preferably from about 0.4 to about 1.2.

The amount of the polyreactive compound that is reacted with the organomagnesium compound will depend primarily on the specific polyreactive and organomagnesium compounds being reacted. In any event, it should be within the range of from about 0.01 to about 0.7 mole per mole equivalent of magnesium compound, preferably from about 0.05 to about 0.6 and more preferably from about 0.1 to about 0.4 based on a difunctional reactive compound. Thus in the case of a polyreactive compound which contains more than two reactive sites, the amount of polyreactive compound will be reduced proportionately. In the case of magnesium compound having the formula MgRR' where R is hydrocarbon and R' is OR, the ratio of polyreactive compound will be lower, as for example, in the range of from about 0.01 to about 0.35 mole equivalents.

Any desired procedure can be used for reacting the organomagnesium compound with the specified ratio of the polyreactive compound. Thus the organomagnesium compound and the polyreactive compound can be reacted by adding the specified amount of polyreactive compound to a solution or dispersion of the organomagnesium compound in an inert diluent, as for example, a hydrocarbon diluent such as n-hexane, n-heptane, branched aliphatic hydrocarbons, aromatic hydrocarbons, such as benzene, toluene, etc., cycloaliphatic hydrocarbons, such as cyclohexane, methylcyclohexene, etc., or a mixture of such diluents. Preferably the reaction will be carried out under an inert atmosphere, as for example, nitrogen, helium, argon, methane, ethane, etc. In general the reaction can be carried out at any temperature, as for example, from about —50° C. to about 200° C.

As another modification of this invention, it may be desirable in some cases to react the modified organomagnesium compounds with a complexing agent. Exemplary complexing agents are ethers, thioethers, aminoethers, tertiary amines, tertiary phosphines, etc. Preferred complexing agents include the aliphatic, aromatic, cycloaliphatic and araliphatic simple or mixed ethers, the non-aromatic tertiary amines, the mixed aliphatic-aromatic tertiary amines, the monohydroxyaliphatic tertiary amines and the mixed ether-amines. Exemplary of the ether complexing agents are the dialkyl ethers wherein the alkyl group contains from 1 to 20 carbon atoms and particularly diethyl ether, diisopropyl ether, dibutyl ether and methylbutyl ether; diaryl ethers such as diphenyl ether; arylalkyl ethers such as phenylmethyl ether; cycloaliphatic mixed ethers such as cyclohexylmethyl ether; cyclic ethers such as dioxane, tetrahydrofuran, N-methyl morpholine, tetrahydrofurfuryl alcohol, etc.; unsaturated ethers such as vinyl ethyl ether, vinyl butyl ether, vinyl propyl ether, vinyl amyl ether, vinyl cyclohexyl ether, vinyl phenyl ether, vinyl tolyl ether, isopropenyl ethyl ether, isopropenyl isopropyl ether, isopropenyl butyl ether, isopropenyl phenyl ether, isopropenyl amyl ether, isobutenyl ethyl ether, allyl methyl ether, allyl ethyl ether, allyl propyl ether, butenyl ethyl ether, butenyl propyl ether, pentenyl amyl ether, vinyl cyclohexyl ether, vinyl cyclophentyl ether, para-vinyl anisole, allyl benzyl ether, vinyl benzyl ether, vinyl phenethyl ether, isopropenyl phenethyl ether, etc., as well as corresponding dialkenyl ethers such as divinyl ether, diallyl ether, etc. Exemplary of the tertiary amine complexing agents are the trialkylmonoamines, the N,N,N',N'-tetraalkyl alkylenediamines, the N,N,N'N'-tetraalkyl diaminocycloalkanes, the dialkylamino alkanols, the dialkylphenylamines, and the tetraalkylphenylenediamines (o, m, or p). Particularly preferred tertiary amine complexing agents include triethylamine, 3-diethylaminopropanol-1, diethylaniline, endoethylene piperazine, N-methyl piperidine, N,N,N'N'-tetraethylethylenediamine, N,N,N',N'-tetraethyldiaminocyclohexane. These modified and complexed compounds can be prepared by reacting the organomagnesium compound first with the polyreactive compound and then with the complexing agent or the complexing agent can be added during the reaction of the organomagnesium compound with the polyreactive compound. In the case of weak complexing agents such as diethyl ether, the complexing agent may be used as a diluent for the reaction between the organomagnesium compound and the polyreactive compound. The amount of complexing agent employed will vary widely depending upon the nature of the complexing agent. Thus, with weak complexing agents such as diethyl ether and dioxane, one can use from 0.1 up to 100 or more moles per magnesium atom and with stronger complexing agents such as tertiary amines, phosphines, some cyclic ethers, etc., an amount of from about 0.1 to about 10 moles, preferably from about 1 to about 3 moles per magnesium atom can be used.

The catalyst compositions of this invention can be employed as catalysts in various polymerization processes. For example, they are excellent catalysts in the polymerization of epoxides. They are also excellent catalysts in the polymerization of cyclic organophosphorus monomers to organic phosphorus polymers.

The following examples are presented to illustrate the modified organomagnesium compounds of this invention. All parts and percentages are by weight unless otherwise indicated. To demonstrate the unique properties of the compounds of this invention when used as catalysts, the polymerization of certain epoxides is shown in the examples. The molecular weight of the polymers produced in those examples is shown by the reduced specific viscosity (RSV) given for each. By the term "reduced specific viscosity" is meant the $\eta_{sp./c.}$ determined on a 0.1% solution of the polymer in a given diluent. In the case of polyethylene oxide, the RSV is determined in chloroform at 25° C. In the citation of the RSV, the diluent, and temperature at which the RSV is determined are stipulated.

EXAMPLE 1

Samples of an ammonia modified diethyl magnesium complexed with diethyl ether were prepared as follows: In each case a closed reactor was pressured with sufficient ammonia at 30° C. to give the desired mole ratio of ammonia to diethyl magnesium as shown in Table I. Then 0.33 part of diethyl magnesium as a 0.5 M solution in diethyl ether was added. The closed reactor was shaken for 20 hours while being maintained at a temperature of 30° C. The resulting samples were tested for activity in polymerizing ethylene oxide.

In each case a polymerization vessel filled with nitrogen was charged with 28.8 parts of n-heptane and 10 parts of ethylene oxide. After equilibrating the vessel and contents at 30° C. the sample of ammonia modified diethyl magnesium in the diethyl ether was added. The polymerization reaction mixture was agitated at 30° C. for 19 hours.

The ether-insoluble polyethylene oxide produced was isolated by adding excess ether to the reaction mixture. In Table I is set forth the total percent conversion to polymer in each case together with the amount of isolated polymer produced in each case, indicated as percent conversion to isolated polymer and percent of the total polymer, and the RSV of the polymer. Also tabulated is the ether-soluble polymer produced. A control polymerization was run using unmodified diethyl magnesium.

TABLE I

| Ex. | Mole ratio of $NH_3$ to diethyl magnesium | Total percent conversion | Isolated polymer | | | Ether-soluble polymer percent conversion |
|---|---|---|---|---|---|---|
| | | | Percent conversion | RSV | Percent of total | |
| 1a | 0.2 | 23 | 23 | 2 | 100 | 0 |
| 1b | 0.4 | 100 | 100 | 60 | 100 | 0 |
| Control | | 4 | 2.1 | 49 | 50 | 2 |

EXAMPLES 2–5

These examples show the preparation of catalyst compositions comprising various modified diethyl magnesium compounds complexed with diethyl ether. In each case 0.33 part of diethyl magnesium was dissolved in diethyl ether in the presence of glass beads to make up a 0.5 M solution. While maintaining the solution at a temperature of 30° C. under an atmosphere of nitrogen an amount of the polyreactive compound equal to the mole ratio recited in Table II was added with agitation. The reaction mixture was then agitated for 20 hours while holding the temperature at 30° C. The resulting modified and complexed compounds were tested for activity in polymerizing ethylene oxide as described in Example 1. In Table II is set forth the polyreactive compound used, together with total percent conversion, and the conversion to ether-insoluble polymer and ether-soluble polymer and the RSV of the ether-insoluble polymer.

hours while holding the temperature at 30° C. The resulting modified and complexed compound was tested for activity in polymerizing ethylene oxide as described in Example 1. In Table III is set forth the total percent conversion, and the conversion to ether-insoluble polymer and ether-soluble polymer and the RSV of the ether-insoluble polymer.

TABLE III

| Ex. | Total percent conversion | Isolated polymer | | | Ether-soluble polymer percent conversion |
|---|---|---|---|---|---|
| | | Conversion | RSV | Percent of total | |
| 6 | 63 | 63 | 47 | 100 | 0 |
| Control | 3 | 3 | 43 | 100 | 0 |

What I claim and desire to protect by Letters Patent is:

1. A catalyst composition consisting essentially of (1) a modified halogen-free organomagnesium compound and (2) at least one liquid diluent selected from the group consisting of (a) inert hydrocarbon compounds and (b) at least one complexing agent for the modified organomagnesium compound, said modified organomagnesium compound comprising the reaction product of a halogen-free organomagnesium compound of the formula R—MG—R' wherein R is a hydrocarbon radical and R' is a substituent selected from the group consisting of hydrogen, R and —OR, with at least one polyreactive compound selected from the group consisting of ammonia, primary alkylamines, primary arylamines, primary aralkylamines, primary cycloalkylamines, primary alkylenediamines, piperazine, hydroxylamine, hydroxy-substituted primary alkylamines, hydroxy-substituted primary alkylenediamines, hydrazine and phenyl hydrazine in an equivalent mole ratio of polyreactive compound to magnesium compound of from about 0.01 to about 0.7 and such that said modified organomagnesium compound retains from about 0.2 to about 1.8 of the magnesium-to-carbon bonds present in the organomagnesium compound so reacted, said complexing agent being selected from the group consisting of dialkyl ethers, dioxane, tetrahydrofuran and trialkylmonoamines.

2. The catalyst composition of claim 1 wherein the halogen-free organomagnesium compound is a dialkylmagnesium.

3. The catalyst composition of claim 1 wherein the polyreactive compound is ammonia.

4. The catalyst composition of claim 2 wherein the modified organomagnesium compound is completed with diethyl ether.

5. The process of preparing the catalyst composition

TABLE II

| Ex. | Mole ratio[1] | Polyreactive compound | Total percent conversion | Isolated polymer | | | Ether-soluble polymer percent conversion |
|---|---|---|---|---|---|---|---|
| | | | | Percent conversion | RSV | Percent of total | |
| 2 | 0.14 | Tetrahydroxyethyl ethylenediamine | 60 | 60 | 58 | 100 | 0 |
| 3 | 0.3 | Ethanolamine | 78 | 78 | 84 | 100 | 0 |
| 4 | 0.1 | Triethylenetetramine | 78 | 78 | 53 | 100 | 0 |
| 5 | 0.5 | Piperazine | 94 | 94 | 49 | 100 | 0 |
| Control | | No polyreactive compound | 4 | 2.1 | 49 | 50 | 2 |

[1] Polyreactive compound to diethyl magnesium.

EXAMPLE 6

This example shows the preparation of a catalyst composition comprising an aniline modified diisopropyl magnesium compound complexed with diethyl ether. In this example 0.44 part of diisopropyl magnesium was dissolved in diethyl ether in the presence of glass beads to make up a 0.5 M solution. While maintaining the solution at a temperature of 30° C. under an atmosphere of nitrogen an amount of aniline equal to a mole ratio of aniline to diisopropyl magnesium of 0.5 was added with agitation. The reaction mixture was then agitated for 20 of claim 1 which comprises reacting a solution of a halogen-free organomagnesium compound of the formula R—MG—R' wherein R is a hydrocarbon radical and R' is a substituent selected from the group consisting of hydrogen, R and —OR in an organic solvent therefor with at least one polyreactive compound selected from the group consisting of ammonia, primary alkylamines, primary arylamines, primary aralkylamines, primary cycloalkylamines, primary alkylenediamines, piperazine hydroxylamine, hydroxy-substituted primary alkylamines, hydroxy-substituted primary alkylenediamines, hydrazine and phenylhydrazine in an inert atmosphere in an equivalent mole ratio of polyreactive compound to magnesium compound of from about 0.01 to about 0.7.

References Cited

UNITED STATES PATENTS

| | | | |
|---|---|---|---|
| 3,186,958 | 6/1965 | Kutner et al. | 260—2 A |
| 3,337,475 | 8/1967 | Fukui et al. | 252—431 N X |
| 3,520,849 | 7/1970 | Vandenberg | 252—431 N X |
| 3,654,183 | 4/1972 | Klein et al. | 252—428 X |
| 3,655,586 | 4/1972 | Vandenberg | 252—428 X |

PATRICK P. GARVIN, Primary Examiner

U.S. Cl. X.R.

260—2 A, 665 R

PO-1050
(5/69)

UNITED STATES PATENT OFFICE
CERTIFICATE OF CORRECTION

Patent No. 3,770,655          Dated November 6, 1973

Inventor(s) Edwin J. Vandenberg

It is certified that error appears in the above-identified patent and that said Letters Patent are hereby corrected as shown below:

Printed Patent Column 5, Table I under Column labeled RSV at line for Example 1a;

"2" should read --92--

Printed Patent Column 6, Claim 4, line 2;

"Completed" should read --complexed--

Signed and sealed this 2nd day of April 1974.

(SEAL)
Attest:

EDWARD M. FLETCHER, JR.
Attesting Officer

C. MARSHALL DANN
Commissioner of Patents